Jan. 23, 1973  C. S. MILLER  3,712,955
METHOD AND APPARATUS FOR OPTICALLY SCANNING SPECIMENS AND
PRODUCING GRAPHIC RECORDS THEREFROM
Filed Jan. 6, 1971 5 Sheets-Sheet 1

INVENTOR
CARLTON S. MILLER
BY Morro, Altman & Oates
ATTORNEYS

Jan. 23, 1973 C. S. MILLER 3,712,955
METHOD AND APPARATUS FOR OPTICALLY SCANNING SPECIMENS AND
PRODUCING GRAPHIC RECORDS THEREFROM
Filed Jan. 6, 1971 5 Sheets-Sheet 3

INVENTOR
CARLTON S. MILLER
BY Morse, Altman & Oates
ATTORNEYS

United States Patent Office
3,712,955
Patented Jan. 23, 1973

3,712,955
METHOD AND APPARATUS FOR OPTICALLY SCANNING SPECIMENS AND PRODUCING GRAPHIC RECORDS THEREFROM
Carlton S. Miller, Lexington, Mass., assignor to PhotoMetrics, Inc., Lexington, Mass.
Filed Jan. 6, 1971, Ser. No. 104,394
Int. Cl. G01n 21/06, 21/22; H04n 1/24
U.S. Cl. 178—6.6 R
18 Claims

ABSTRACT OF THE DISCLOSURE

A specimen, such as a photographically recorded image, microscope slide or the like, is spirally scanned by a high speed scanning optical microscope which produces in real time on a recording table a spirally formed record wherein the density, transmission, fluorescence or similar characteristics of the specimen are measured and presented in graphic form. A high resolution facsimile recording system is employed for producing a hard copy image which may be manipulated for quantization, contrast shaping and control, edge enhancement, noise suppression or the like. A wide range of magnifications is possible by the availability of differential movement rates between the specimen and the writeout.

BACKGROUND OF THE INVENTION

(1) Field of the invention

This invention relates generally to optical scanning and to a method and associated apparatus for optically scanning various specimens and producing therefrom graphic records bearing data as to the density, transmission, reflectivity, fluorescence or similar characteristic of the specimen. More particularly this invention relates to an electronic data processing optical scanning system for applications in photomicroscopy, microdensitometry, interference microscopy, dark field microscopy, optical density contour mapping and digital recording of continuous-tone image data.

(2) Description of the prior art

Optical scanning and recording instruments have been employed heretofore for such purposes as microdensitometry, photographic photometry, optical density contour mapping, image recording and the like. Conventional microdensitometers usually operate in a one dimension mode, scanning along a single line of the specimen. Some cover two-dimension patterns by means of a raster of parallel lines. Since the heavy sample stage must be accelerated at the beginning and end of each scan line, the scanning speed of such systems is limited.

To achieve the ultimate in spatial resolution and photometric fidelity as required, for example, in a scanning microdensitometer, it is necessary to use a paraxial optical system and to effect a scan by physically moving the sample between the illuminating and light collecting optical components. Illumination and collecting light cones are usually symmetrical about the sample plane and the light must always impinge on the same area on the photo detector.

Line and rectangular raster scanning systems employing this type of high quality graphics require long times to effect the scan of an entire specimen. Microdensitometers such as disclosed in U.S. Patents 3,424,534, 3,503,689 and 3,520,624, for example, frequently require several hours to produce a high resolution isodensity contour map. The time factor is believed to be the principal reason why scanning techniques using microdensitometer optics have not been employed heretofore to produce photomicrographs. Scanning speed can be increased by the use of a drum scanner wherein the specimen is mounted on a transparent drum which is then rotated. Movement of the drum or optical system along the path parallel to the drum axis would effectively scan the entire specimen. However, such instruments are unsuitable for obtaining any significant magnification in the output.

It is an object of the present invention to provide improvements in optical scanning techniques and instruments and more particularly it is an object of the present invention to provide a high speed, high resolution method and apparatus for optically scanning a specimen such as a microscope slide, photographically recorded image, or the like, to measure the density, transmission or reflectivity characteristics of the sample and produce a graphic record thereof in real time.

SUMMARY OF THE INVENTION

This invention features the method of optically scanning a specimen such as a microscope slide, photographically recorded image or the like, to produce a graphic record therefrom comprising the steps of spirally scanning the sample with a beam of light which is modulated according to certain optical characteristics of the specimen, converting the modulated beam into electrical signals and recording the signals. In the preferred output mode, the electrical signals are converted into visible recording signals and spirally plotted to produce a graphic record of the specimen's characteristics.

This invention also features an optical scanning instrument and system, comprising a rotary specimen stage and at least one rotary recording stage, these stages being slaved together and driven at an identical and uniform rate. A light beam spirally scans the specimen on the rotating specimen stage to produce modulated optical signals and electronic circuitry converts, the optical signals into electronic signals which, in turn, operate a recording stylus operatively positioned with respect to the recording stage. Through a differential in movement rate between the scanning beam and recording stylus magnification is achieved. The electrical signals are processed electronically to vary contrast and edge response and otherwise control the relationship between the property of the specimen and its corresponding graphic record. This invention also features a facsimile recording system wherein the recording stylus electrically produces a high resolution image quickly and cleanly.

DETAILED DESCRIPTION OF THE PREFERRED EMBODIMENTS

Figure 1:
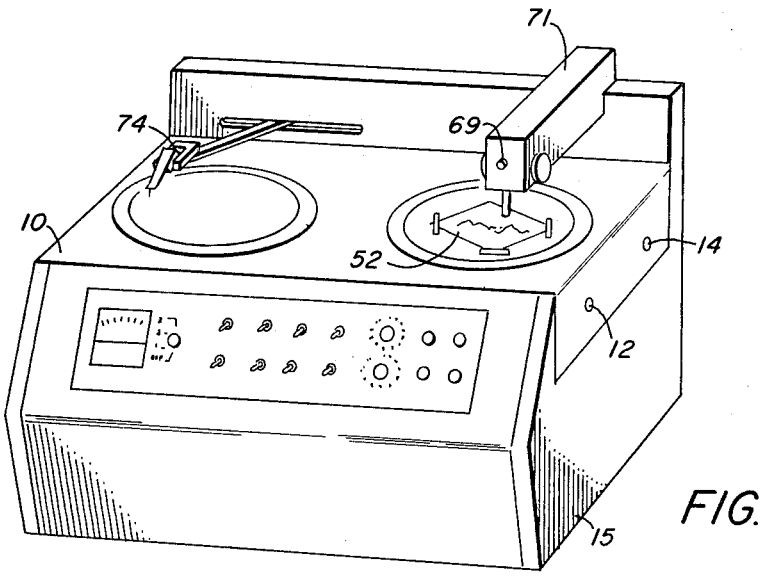
FIG. 1 is a view in perspective of an optical scanning instrument made according to the invention.
Figure 2:
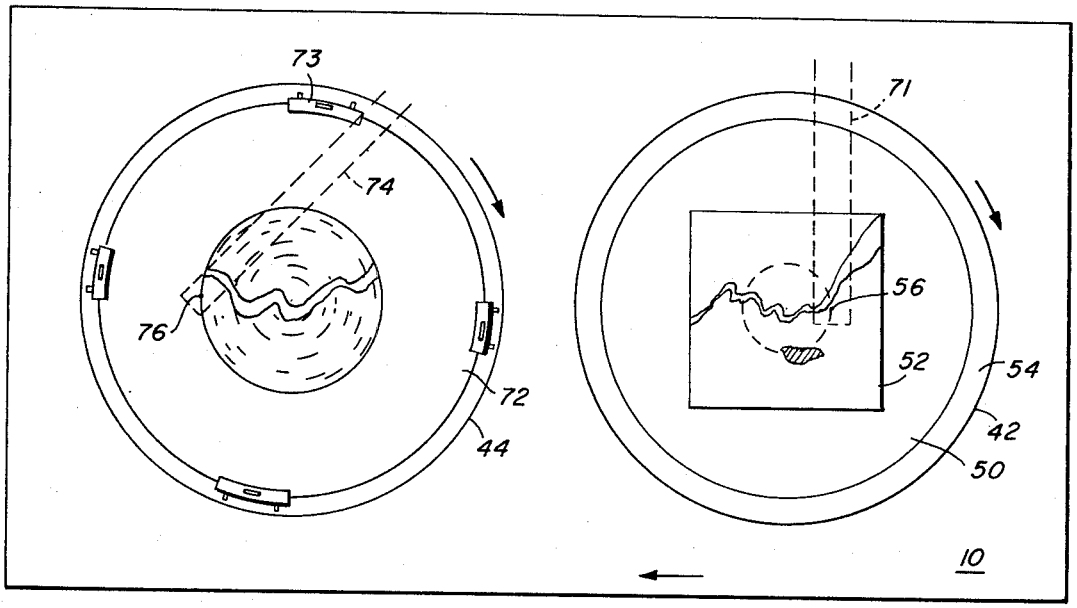
FIG. 2 is a top plan view of the specimen and recording stages of the instrument.
Figure 3:
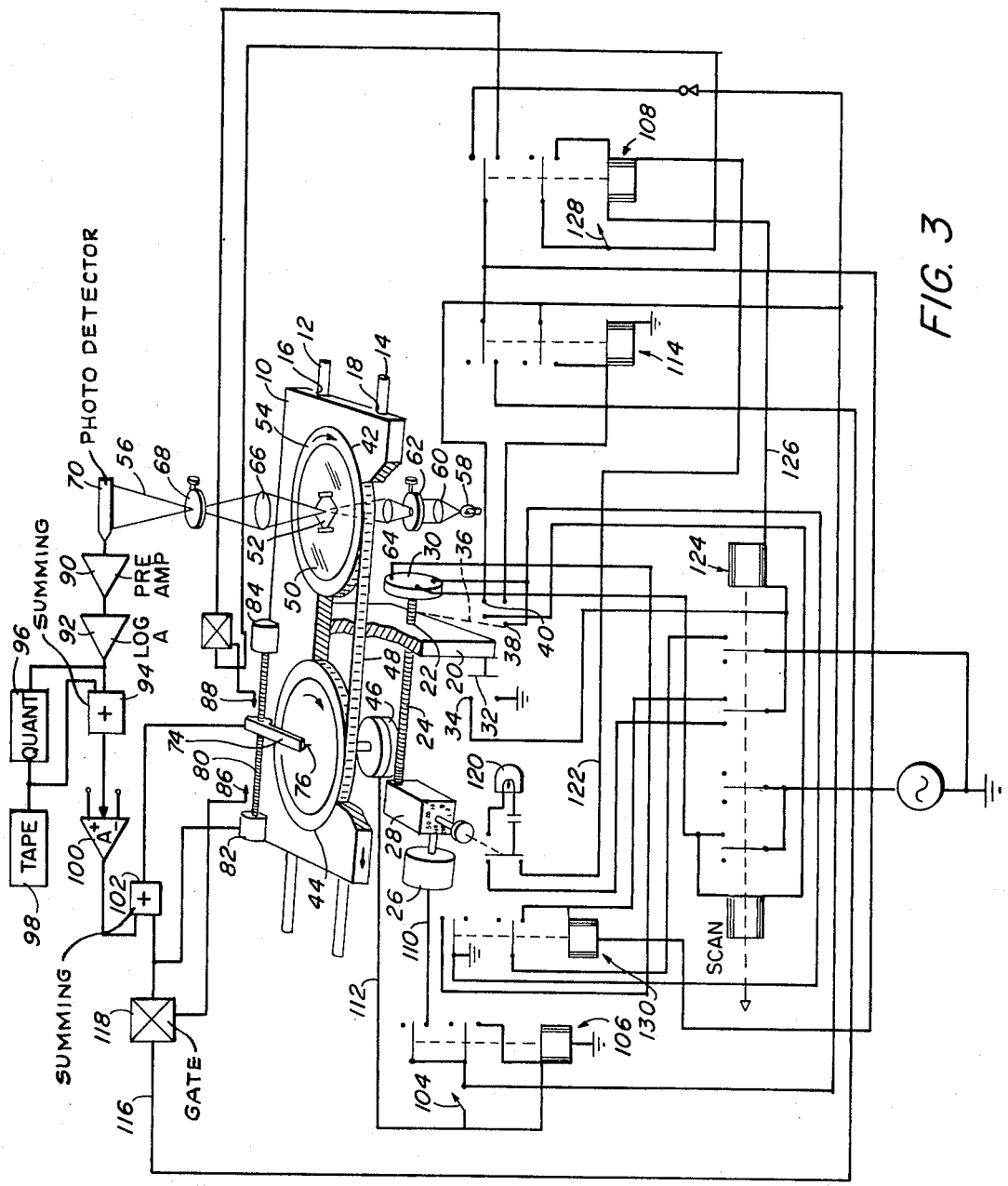
FIG. 3 is a schematic diagram of the control system for the instrument.

Referring now to FIGS. 1, 2 and 3, the optical scanning system generally is organized about a carriage 10 mounted for horizontal longitudinal movement as by slideways 12 and 14 fixed to a housing 15 and engaging a pair of parallel, longitudinally extending grooves or ball bushings 16 and 18 formed in the underside of the carriage 10. The carriage 10 includes a depending extension 20 formed with a circular tapped opening 22 through which extends in threaded engagement a lead screw 24 rotated by a carriage drive motor 26 operating through a variable speed gear box 28. Operation of the motor 26 will cause rotation of the lead screw 24 this, in turn, causing the carriage 10 to move along the ways 12 and 14. In the illustrated embodiment, the motion during a scanning and recording operation is from right to left as viewed in FIGS. 1–3. The speed of advance of the carriage 10 is selectievly controlled by the setting on the variable speed gear box 28 this, in turn, controlling the magnification produced by the instrument as will presently appear. The lead screw 24 at its right-hand end as viewed in FIG. 1 is also drivingly connected to a high speed retract motor 30 which is employed to return the carriage 10 to a start position upon completion of a scanning cycle. Coarse and fine carriage position encoding devices are provided for automatically sensing the start position of the carriage. The coarse carriage position encoder includes a switch contact 32 carried by the carriage extension 30 and adapted to close switch contacts 34. The fine stage position encoder includes switch contact 36 carried by the lead screw 24 and adapted to close switch contacts 38 and 40. Collectively these encoders provide automatic registration in the longitudinal direction between the optical axis and the axis of rotation of the specimen stage, a necessary precondition for the start of a scan.

Rotatably mounted to the carriage 10 are a specimen stage 42 and a recording stage 44. The two rotary stages are slaved together to rotate at the same constant angular speed and, in the illustrated embodiment, this is achieved by means of a drive motor 46 coupled to the recording stage 44 which, in turn, is drivingly connected to the specimen stage 42 by means of a flexible belt 48 engaging both rotary stages.

The specimen stage 42 is provided with a transparent center portion 50, typically a circular glass plate, adapted to support a specimen 52 such as a microscope slide, photographic transparency or the like. The plate 50 is mounted within an annular frame 52 rotatably supported to the carriage 10 by precision ball bearings (not shown). The specimen 52 may be secured to the center of the plate 50 by clips, tape or other fastening means to be scanned by a beam of light 56 from a lamp 58, the beam passing through a collecting lens 60, an adjustable field slit 62, a condenser lens 64, through the plate 50 and the sample 52, thence through an objective lens 66 and a final adjustable scanning aperture 68 against a photo-detecting device 70 such as a photomultiplying tube. The optical components 58–64 are mounted below the carriage 10 and within the housing 15 in fixed position while the optical components 66–70 are mounted to an arm 71 fixed to the housing and extending across the carriage. A viewing eyepiece 69 may be provided on the arm 71 for focussing, alignment and the like. It will be understood that as the specimen stage 42 rotates with the specimen 52 and as the carriage 10 moves along the ways 12 and 14, the specimen will be spirally scanned by the light beam 56, which beam will remain fixed. As the specimen is scanned, changes in density of the specimen will modulate the light beam and this, in turn, will modulate the electrical output of the photodetector 70. These modulated electrical signals are omployed to control the recording on the printout at the recording stage 44 as will be described in detail below.

The recording stage 44, in the illustrated embodiment, is a flat circular plate corresponding in size with that of the sample stage but in this instance the stage 44 is a conductive metal such as aluminum to form part of a facsimile recording system. The stage 44 is employed to support a recording medium such as facsimile recording paper 72, typically circular, and which may be mounted on the recording table as by means of marginal clamps 73 or the like, which assure electrical contact between the grounded aluminum stage and the electrically conducting surface of the facsimile recording paper. Extending above the recording stage 44 is an arm 74 carrying a pivotally mounted electric stylus 76 at the outer free end thereof and directed down towards the facsimile recording paper 72 on the stage 44. The stylus terminates in intimate contact with the facsimile paper secured and electrically grounded to the recording stage and, when energized, produces through ohmic heating of the surface of the facsimile paper 72 a mark on the facsimile paper 72, the character of the mark being controlled by the electric potential applied between stylus 76 and the paper 72 this, in turn, being modulated and processed according to the modulations of the light beam 56 scanning the specimen. Other marking devices responsive to electrical signals may also be employed.

The arm 74 is drivingly connected to a lead screw 80 driven by a write out drive motor 82 mounted on the carriage 10 and adapted to move the arm so that the tip of the stylus 76 traverses a radial path with respect to the recording stage 44. The motion will produce a spiral recording path with respect to the recording medium 72 corresponding with the spiral scanning path taking place at the scanning stage. The lead screw 80 is also connected to a high speed return motor 84 which serves to return the stylus to a start position at the end of a recording cycle.

The principle of the spiral scan is as follows. At the beginning of a scan, both the optical system associated with the specimen stage and the stylus at the recording stage are centered over the respective rotation axes of the two stages. Accurate and automatic indexing of the specimen stage is achieved by means of the encoder described in a preceding section of this disclosure. As the scanning begins, the recording stylus is differentially driven by the motor 82 with respect to the optical system of the specimen stage. If they both are driven at the same rate a 1:1 magnification results. If the stylus and optical systems are driven at rates of 1:5, 10, 10, 100 or 1,000, magnification of 5, 10, 20, 100 or 1,000 will result. The recording is achieved by modulating the voltage applied to the recording stylus as a function of the photomultiplying output, this, in turn, being a function of the specimen's density, transmission or the like.

In the illustrated instrument both of the rotating stages and stylus assembly are mounted on the common moving carriage 10. The carriage is driven linearly at any one of ten speeds by means of the motor 26, the speed selection being controlled by the variable speed gear box 28 as previously indicated. The recording stylus 76 is driven at a single speed by the motor 82 and is physically attached to the carriage 10. The arrangement produces a differential rate of movement between the scanning and recording systems and produces the magnification. The differential rates of movement and the magnification are controlled by the relative radial rates of movement of the stylus, which is driven at a constant speed, and the carriage 10, which is driven at a variable and selectable speed. While the carriage has been indicated as being movable at different discrete rates of speed, a continuously variable drive of the carriage 10 may be provided to effect a zoom system with a range from 1:1 to more than 1:1,000.

Associated with stylus arm is a pair of limit switches 86 and 88, both normally closed, the switch contact 86 serving as the end of scan limit switch for the stylus arm while the switch contact 88 serves as the center return limit switch for the arm. As the arm moves to the left during a recording cycle, it will actuate the switch 86 at the end of the cycle to de-energize the drive motor 82 and energize the return motor 84. As the arm reverses itself moving to the right, it will actuate the switch 88 when it reaches a center or start position to de-energize the return motor 84.

The functional circuitry for the system is generally organized into electronic controls for stylus recording and electrical controls for operating the carriage, the stages and the motion of the stylus. The electronic components which control the operation of the stylus include a pre-amplifier 90 the input of which is the output of the photo-detecting device 70, serving to amplify the signals generated by the photodetector in response to density or similar changes in the specimen and to tailor the signal to the input requirements of the logarithmic amplifier. The output of the pre-amplifier is fed into a logarithmic amplifier 92 which has an output, the voltage of which is logarithmically related to the transmission characteristics of the specimen and hence is a linear function of the density of the specimen. The output of the log amplifier 92 is fed to a summing device 94 which is also connected to a quantizing circuit 96. The quantizer 96 is adapted to produce pulses at preset voltage levels pre-set by the operator to generate contour lines on the printout 72. The signals obtained by the scanning operation may also be fed to a magnetic tape recording system 98 for digital recording on a magnetic tape or the like for subsequent used. Also, the signals may be fed directly to an on line computer. From the device 94, the signals are further amplified by a stylus amplifier 100 and fed through another summing device 102 to the stylus arm 74 where the stylus tip 76 is recording or plotting data in accordance with the modulated voltage applied thereto.

The electrical controls for the instrument include a scan switch 104 which will cause the relay 106 to be self-latched by power received from a closed loop consisting of the stylus arm limit switch 86 and a relay 108. This will supply power to the carriage drive motor 26 and to the drive motor 46 for the rotary recording and specimen stages through leads 110 and 112, respectively. The lead screw 24 will turn until the main stage 10 positions the center of rotation of the specimen stage 52 coincident with respect to the optical axis of the beam 56. This is achieved automatically and accurately as previously described. Similarly, the stylus 10 will be located at the center of rotation of the recording stage at the start of a scanning and recording cycle. This is accomplished semi-auomatically, final adjustment being made manually by a manual override switch. At this point, the encoder 36 self-latches relay 114, applying power to the motor 82 through a lead 116 and a gate 118, at the same time closing the switch 102 to feed the scanning signals to the stylus. The limit switch 86 as previously indicated, is the end of the scan switch for the stylus and, when this is actuated by the stylus arm or manually, the relay 114 and the relay 106 are unlatched to stop motors 82, 26 and 46.

In order to return the carriage and stylus arm to a center position for another scanning cycle, the gear box 28 must be in a neutral position as sensed by an encoder 120 supplying a ground to the relay 108 through a lead 122 and to the relay 124 through a lead 126. When a switch contact 128 associated with relay 108 is closed, the relay 108 self-latches, energizing the high speed stylus return motor 84 to return the stylus to a start position, moving it to the right as viewed in FIGS. 1, 2 and 3. At the same time, the relay 124 is latched to the right. A relay 130 is in the unlatched position enabling the high speed carriage return motor 30 to operate in the reverse mode, moving the carriage to the right until the encoder 32, 34 is actuated and shorted. At this point, the lead screw 24 is within one revolution of the encoder 36. The relay 130 is then self-latched and the motor 30 now rotates the lead screw 24 in the forward direction until the encoder 22 latches relay 124 to the left, unlatching relay 130 and breaking power to the motor 30. The stylus meantime has been traveling to the right until the limit switch 88 is actuated to stop the motor 84 and unlatching the relay 108 leaving the system in condition for the next scanning cycle.

The system is designed so that when the carriage is returning to a start position it overtravels the starting point, the center of rotation of the specimen stage moving to the right past the optical axis before stopping. Start-up backlash and the effects of inertia are eliminated by moving the carriage and rotating the specimen stage prior to initiating the scan. This is done by rotating the specimen stage and moving it from its overtravel position towards the optical axis. When the carriage moves the axis of the specimen stage into alignment with the optical axis, the scanning operation is started with the components already in motion.

While the invention has been described with particular reference to the illustrated embodiment, various modifications will appear to those skilled in the art. For example, instead of mechanically coupling the rotating scanning and recording stages, they may be separately driven as by a pair of synchronous motors. Such an arrangement would permit the two rotary stages to be physically distant from one another, being coupled only electrically. Also, instead of a single recording stage slaved to the signal scanning stage, multiple recording stages may be employed, each with its own stylus which may operate independently of the other stylus. Such a tandem arrangement would permit several recording operations to be carried on at the same time from a single specimen and thereby obtain different magnifications and/or different recording plots, one printout being a continuous tone image while the other may be given contour lines, as desired. The tandem arrangement also would permit recording operations in multiple laboratories slaved to a single remotely located specimen scanner. Various mechanical means may be used to support and move the carriage as well as to support and rotate the rotary stages including air bearings for very high magnification recordings. Further modifications may include an optical reflecting system rather than an optical transmission system in which case the light source would be located above the specimen stage and the reflectivity characteristics of the specimen would modulate the beam. Also, in place of the facsimile recording stylus, a modulated light beam recording on photographic print material may be utilized. However, the facsimile recording system described herein is preferred by reason of its speed, the ease by which the many electronic controls may be used to alter or improve imagery. These include contrast enhancement, edge enhancement, noise suppression or other signal manipulations. Further, the writeout resolution using the facsimile system is on the order of 300 lines per inch to produce imagery of unusually high visual quality.

Figure 4:
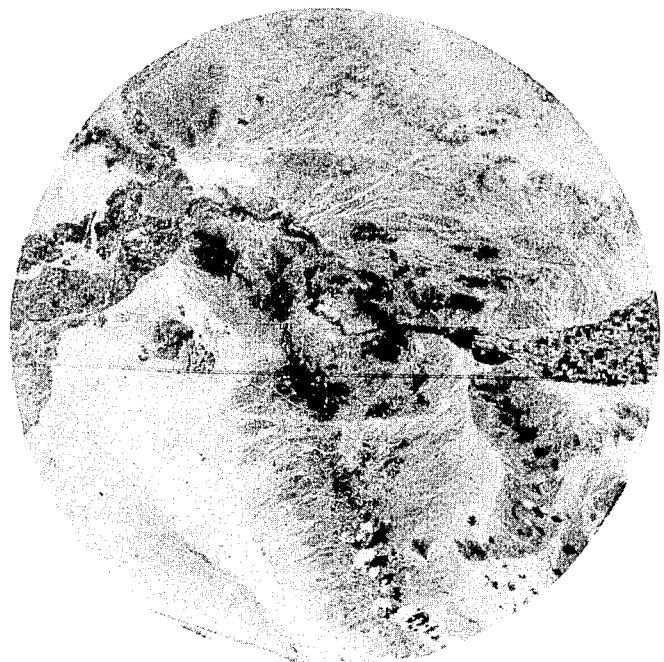
FIG. 4 is a magnified continuous tone record produced by the instrument from a photographic image.
Figure 5:
FIG. 5 is another record made from the same image plotted with contour lines superimposed on the continuous tone background.
Figure 6:
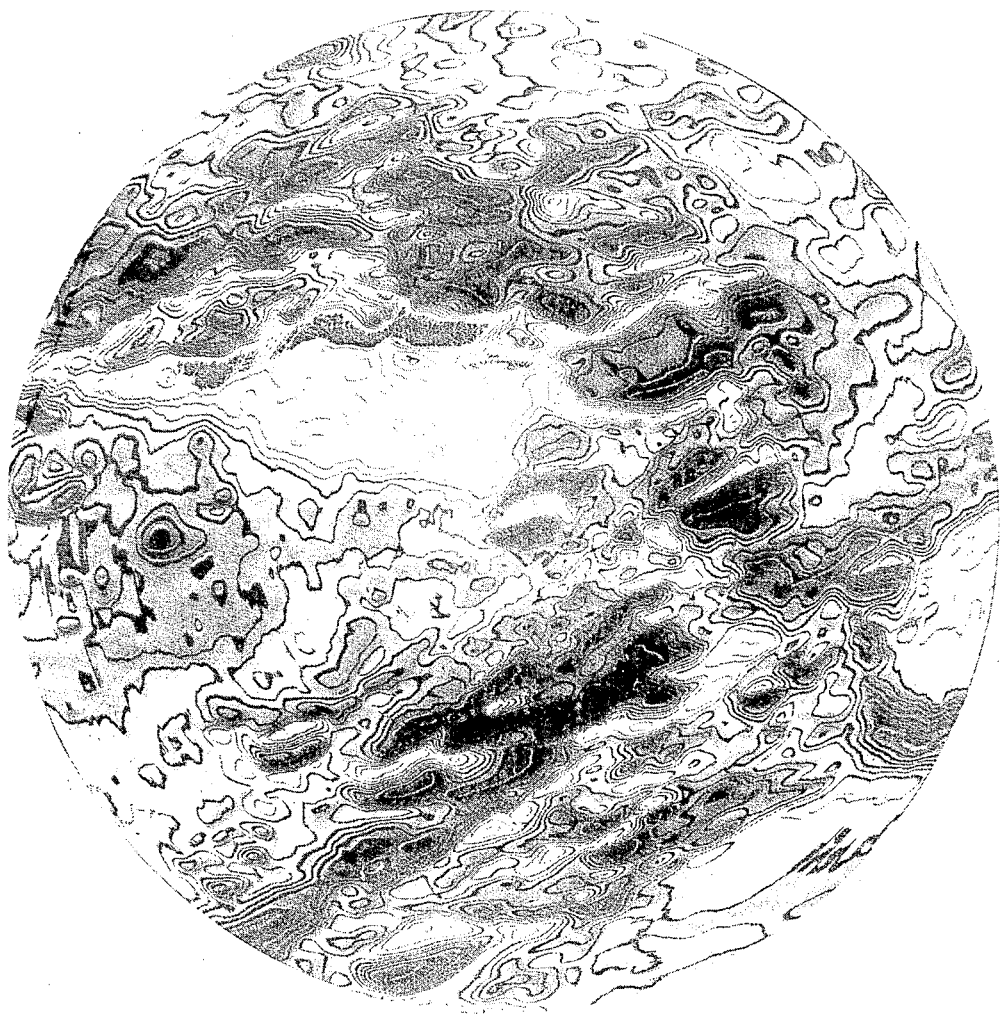
FIG. 6 is another record wherein superimposed contour lines are employed as artificially generated edges, and, FIG. 7 is a block diagram of the signal processing and control system.

The method and apparatus disclosed herewith makes possible very high speed, high quality scanning and recording operations, typical scanning speeds being on the order of $3 \times 10^6$ sampling points scanned in a ten minute period. A high resolution, permanent and accurately enlarged record, such as shown in FIGS. 4, 5 and 6 can be made on the order of eight inches in diameter or more during the real time of the scan as positive or negative photomicrographs with excellent gray scale rendition, all with optical density contour lines superimposed as shown in FIG. 5.

Figure 7:
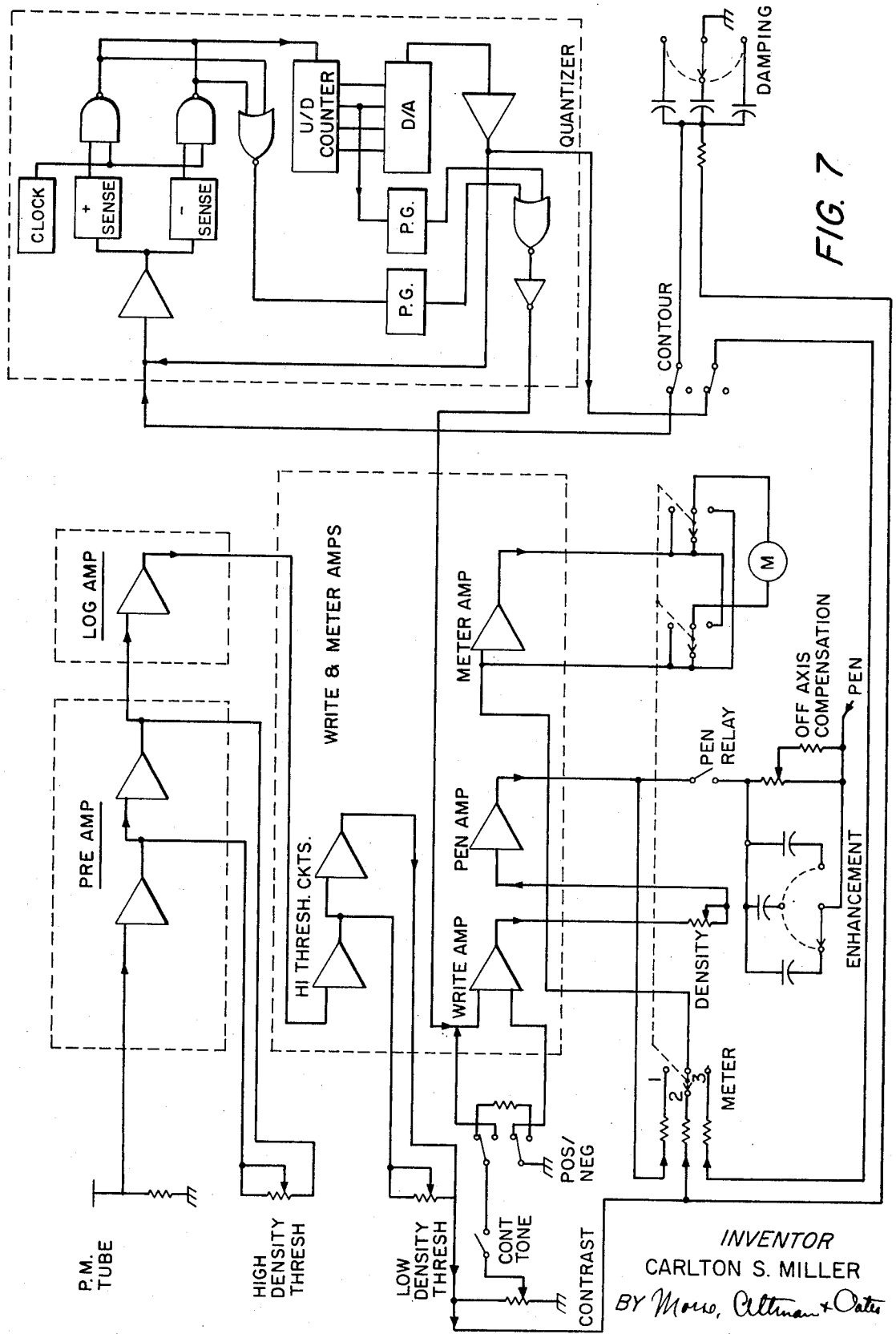

In FIG. 7 there is shown the results of superimposed contour lines on continuous tone imagery to achieve contrast enhancement by adding artificially generated edges. The contour lines are obtained by differentiation, a positive output being produced on one side of a contour and a negative output produced on the other side.

Having thus described the invention what I claim and desire to obtain by Letters Patent of the United States is:

1. The method of optically scanning a specimen to produce a record therefrom, comprising the steps of (a) spirally scanning said specimen with a focussed beam of light to modulate said beam according to certain optical characteristics of said specimen, (b) detecting said modulated beam, (c) converting the modulated beam into modulated electrical signals, (d) converting said modulated electrical signals into modulated display signals, and, (e) spirally plotting a two dimensional graphic record of said specimen with said modulated display signals.

2. The method of claim 1 including the step of plotting said record at a radial rate different from the radial scanning rate of said specimen to magnify said record.

3. The method of claim 1 including the step of electronically processing said electrical signals according to predetermined levels of modulation and form contour lines on said record.

4. Apparatus for optically scanning a specimen to produce a record therefrom, comprising (a) a rotatable stage adapted to support said specimen, (b) power means for rotating said stage and operatively connected thereto, (c) optical means for directing a focussed light beam against said specimen, (d) means mounting said stage and said optical means for producing relative lateral movement therebetween whereby said specimen will be spirally scanned by said beam upon rotation of said stage, said beam being modulated according to the optical characteristics of said specimen, (e) photo-electric means in the path of said beam for converting the modulated beam into corresponding modulated electrical signals, (f) recording means responsive to said photo-electric means for recording said signals, (g) said recording means including another rotatable stage slaved to said first stage for suporting a recording medium thereon and a recording device positioned in operative proximity to said second stage and adapted to produce markings on said medium in response to the modulated electrical signals, and, (h) means mounting said other stage and said recording device for producing relative lateral movement therebetween whereby said markings will be spirally plotted on said medium upon rotation of said other stage.

5. Apparatus according to claim 4 wherein said other stage is electrically conductive and said recording device is an electrode to form a facsimile recording system.

6. Apparatus according to claim 4 including selectively variable drive means operatively connected to said apparatus for selectively varying the speed of relative lateral movement between said stage and said optical means to thereby magnify the recording with respect to said specimen.

7. Apparatus according to claim including 4 including quantizing circuit means connected to said photo electric means for processing said modulated electrical signals according to predetermined modulation levels for controlling said recording means to thereby produce selectively density, transmission or reflectively contour lines superimposed on a continuous tone background.

8. Apparatus according to claim 4 including means mounting said recording device for independent radial movement relative to said other rotatable stage.

9. Apparatus according to claim 4 wherein said recording means includes a tape recorder.

10. Apparatus according to claim 4 in combination with a computer, adapted to receive and process signals from said apparatus.

11. Apparatus according to claim 4 including control means operatively connected to said power means and said mounting means for rotating said stage and moving one of said stage and said optical means in advance of alignment of their axes, and sensing means connected to said recording means for initiating a scanning cycle upon alignment of said axes.

12. Apparatus according to claim 4 wherein said specimen stage includes an optically transparent portion and said optical means includes a light source on one side of said specimen stage and said photo-electric means is located on the opposite side thereof.

13. Apparatus according to claim 4 including drive means operatively connected to said recording device for moving said device radially of said other stage.

14. Apparatus according to claim 13 including a common support for both of said stages and power means drivingly connected to said support for moving said support laterally with respect to said optical means.

15. Apparatus according to claim 4 including a carriage supporting both of said stages for rotation about parallel axes, means mounting said carriage for movement along a path perpendicular to said axes and said beam, said optical means being fixed, carriage drive means operatively connected to said carriage for movement thereof.

16. Apparatus according to claim 15 wherein the speed of said carriage drive means is variable.

17. Apparatus according to claim 15 including means mounting said recording device for movement along a path parallel to said carriage path and radial to said other stage.

18. Apparatus according to claim 17 wherein said recording device mounting means includes a rotatable lead screw mounted to said carriage, a follower threaded to said screw and connected to said device and control means operatively connected to said lead screw for limited rotation thereof in either direction.

References Cited

UNITED STATES PATENTS

| | | | |
|---|---|---|---|
| 2,184,162 | 12/1939 | Stockbarger | 356—158 |
| 2,127,161 | 8/1938 | Cook | 178—6.6 B |
| 2,314,499 | 3/1943 | Howard | 178—7.6 |
| 3,214,515 | 10/1965 | Eberline | 178—6.8 |
| 2,637,024 | 4/1953 | Lyman | 346—74 E |
| 2,721,989 | 10/1955 | Gates | 178—6.6 A |
| 3,225,136 | 12/1965 | Furon | 178—6.6 R |

HOWARD W. BRITTON, Primary Examiner

U.S. Cl. X.R.

178—7.6; 356—203